United States Patent [19]

Yoshida et al.

[11] Patent Number: 5,058,698
[45] Date of Patent: Oct. 22, 1991

[54] CRUISE CONTROL SYSTEM FOR AUTOMOTIVE VEHICLE

[75] Inventors: Kiyoshi Yoshida; Isao Yamamoto; Hiroshi Inoue; Kazuyuki Mori; Koichi Suzuki; Kinichiro Nakano; Hiroyuki Nomura; Yoshiyuki Etoh, all of Kanagawa, Japan

[73] Assignee: Nissan Motor Company, Limited, Yokohama, Japan

[21] Appl. No.: 559,377

[22] Filed: Jul. 26, 1990

Related U.S. Application Data

[63] Continuation of Ser. No. 259,820, Oct. 19, 1988, abandoned.

[30] Foreign Application Priority Data

Oct. 20, 1987 [JP] Japan .................. 62-160076
Oct. 20, 1987 [JP] Japan .................. 62-160078

[51] Int. Cl.$^5$ .................................................. B60K 31/04
[52] U.S. Cl. .................................... 180/179; 180/178; 74/878; 123/350; 364/431.07
[58] Field of Search ............... 180/170, 171, 172, 173, 180/174, 175, 176, 177, 178, 179; 123/350, 351, 399; 364/426.04, 569, 431.07; 74/878

[56] References Cited

U.S. PATENT DOCUMENTS

4,165,722  8/1979  Aoyama .......................... 180/178 X

FOREIGN PATENT DOCUMENTS

| 2754439 | 6/1979 | Fed. Rep. of Germany | 180/179 |
| 0042131 | 3/1985 | Japan | 180/179 |
| 0036024 | 2/1986 | Japan | 180/179 |
| 0036026 | 2/1986 | Japan | 180/179 |
| 2046478 | 11/1980 | United Kingdom | 180/179 |

*Primary Examiner*—Andres Kashnikow
*Assistant Examiner*—Brian L. Johnson
*Attorney, Agent, or Firm*—Foley & Lardner

[57] ABSTRACT

A cruise control system for an automotive vehicle with a manual or automatic transmission, includes an inhibition circuit. The inhibiting circuit blocks communication between a power supply and an actuator and/or a controller when the manual transmission is set in a predetermined gear or when the automatic transmission is set in a driving range other than the drive range, so as to inhibit the controller from operating in the cruise control mode. When the vehicle is provided with an automatic transmission which is selectively set in first, second, third or fourth gear while the shift lever is set in the drive range position, the cruise control system includes a first inhibiting circuit which blocks the communication when the shift lever is set in a position other than the drive range position, and a second inhibiting circuit which blocks the communication when the automatic transmission is set in either the first or second range while the shift lever is set in the drive range position.

6 Claims, 6 Drawing Sheets

CRUISE CONTROL SYSTEM FOR AUTOMOTIVE VEHICLE

This application is a continuation of application Ser. No. 259,820, filed Oct. 19, 1988, now abandoned.

BACKGROUND OF THE INVENTION

1. Field of the Invention

The present invention relates generally to a cruise control system for automotive vehicles. More specifically, the invention relates to a system for automatically controlling the vehicle speed so that the vehicle runs at a desired speed set by the driver of the vehicle.

2. Description of the Prior Art

In recent years, various cruise control systems for automotive vehicles have been proposed. Such cruise control systems can automatically adjust the vehicle speed by operating switches or the like so that the vehicle can run at a set constant speed. For example, when the vehicle is running on a highway, such systems are convenient to the driver since he or she needs not always step on the accelerator pedal in order to cause the vehicle to run at a desired, constant-speed.

The cruise control system may be used for vehicles with either manual or automatic transmissions. In the case of such a conventional system incorporated in the manual transmission, if the system is operated while the vehicle is moving at a low-speed or at a gear position in which high torque is required, such as first or second gear, noise and fuel consumption are increased, since high engine speed is maintained. On the other hand, in the case of such a conventional system incorporated in the automatic transmission, the system can not only be operated while the automatic transmission is set in the normal driving mode, i.e. a drive range (D range), but also in reverse mode (R range), or in a first or second gear by which engine braking or high torque is obtained. If this system is operated while the transmission is set in the first or second gear, a great deal of noise tends to be produced during driving, and fuel consumption is increased.

SUMMARY OF THE INVENTION

It is therefore a principal object of the present invention to eliminate the aforementioned disadvantage and to provide a cruise control system which can not be activated when a transmission is set in a certain mode.

In order to accomplish the aforementioned and other specific objects, a cruise control system for an automotive vehicle, according to the present invention, includes an inhibiting means for inhibiting a control means of the system from controlling an actuator means when a transmission is set in a predetermine mode. Preferably, the inhibiting means blocks communication between a power supply and the actuator means, when the transmission is set in the predetermined mode.

According to one aspect of the invention, the cruise control system for an automotive vehicle comprises:

sensor means for monitoring the actual speed of the vehicle to produce a first signal indicative of the detected vehicle speed;

speed setting means for allowing manual setting of a desired speed of the vehicle to produce a second signal indicative of the set speed;

actuator means for actuating a mechanism which varies the vehicle speed;

control means for controlling the actuator means on the basis of the first and second signals so as to adjust the vehicle speed to the set speed; and inhibiting means for inhibiting the control means from controlling the actuator means when a transmission is set in a predetermined mode.

The inhibiting means may block communication between a power supply and the actuator means when the transmission is set in the predetermined mode. The control means may comprise first means for establishing a first communication between a power supply and the actuator means, second means for controlling the actuator means on the basis of the first and second signals so as to adjust the vehicle speed to the set speed, and third means for establishing a second communication between the power supply and the second means, and the inhibiting means may block the second communication when the transmission is set in the predetermined mode.

According to another aspect of the invention, a cruise control system for an automotive vehicle with a manual transmission, comprises:

sensor means for monitoring the actual speed of the vehicle to produce a first signal indicative of the detected vehicle speed;

speed setting means for allowing the manual setting of a desired speed of the vehicle to produce a second signal indicative of the set speed;

actuator means for actuating a mechanism which varies the vehicle speed;

control means for controlling the actuator means on the basis of the first and second signals so as to adjust the vehicle speed to the set speed; and inhibiting means for inhibiting the control means from controlling the actuator means when the manual transmission is set in an predetermined gear.

The inhibiting means may block communication between a power supply and the actuator means when the manual transmission is set in the predetermined gear. The control means may comprise first means for establishing a first communication between a power supply and the actuator means, second means for controlling the actuator means on the basis of the first and second signals so as to adjust the vehicle speed to the set speed, and third means for establishing a second communication between the power supply and the second means, and the inhibiting means may block the second communication when the manual transmission is set in the predetermined gear. The predetermined gear is a gear other than fourth or fifth gear.

According to another aspect of the invention, a cruise control system for an automotive vehicle with an automatic transmission which is selectively set in the neutral, reverse or drive mode, comprises:

sensor means for monitoring the actual speed of the vehicle to produce a first signal indicative of the detected vehicle speed;

speed setting means for allowing manual setting of a desired speed of the vehicle to produce a second signal indicative of the set speed;

actuator means for actuating a mechanism which varies the vehicle speed;

control means for controlling the actuator means on the basis of the first and second signals so as to adjust the vehicle speed to the set speed; and inhibiting means for inhibiting the control means from controlling said actuator means when the automatic transmission is set in a mode other than the drive mode.

The inhibiting means may block communication between a power supply and the actuator means when the automatic transmission is set in a mode other than the drive mode. The control means may comprise first means for establishing a first communication between power supply and the actuator means, second means for controlling the actuator means on the basis of the first and second signals so as to adjust the vehicle speed to the set speed, and third means for establishing a second communication between the power supply and the second means, and the inhibiting means may block the second communication when the automatic transmission is set in a mode other than the drive mode.

According to another aspect of the invention, a cruise control system for an automotive vehicle with an automatic transmission in which the shift lever is selectively set in the neutral, reverse or drive range position and which is selectively operable between first, second, third or fourth gear while the shift lever is set in the drive range position, comprises:

sensor means for monitoring the actual speed of the vehicle to produce a first signal indicative of the detected vehicle speed;

speed setting means for allowing manual setting of a desired speed of the vehicle to produce a second signal indicative of the set speed;

actuator means for actuating a mechanism which varies the vehicle speed;

control means for controlling the actuator means on the basis of the first and second signals so as to adjust the vehicle speed to the set speed;

first inhibiting means for inhibiting the control means from controlling the actuator means when the shift lever is set in a position other than the drive range position; and second inhibiting means for inhibiting the control means from controlling the actuator means when the automatic transmission is in either the first or second gear while the shift lever is set in the drive range position.

The first inhibiting means may block communication between a power supply and the actuator means when the shift lever is set in a position other than the drive position, and the second inhibiting means may block the communication when the automatic transmission is set in either the first or second gear while the shift lever is set in the drive range position. The control means may comprise first means for establishing a first communication between a power supply and the actuator means, second means for controlling the actuator means on the basis of the first and second signals so as to adjust the vehicle speed to the set speed, and third means for establishing a second communication between the power supply and the second means, and the first inhibiting means may block the second communication when the shift lever is set in a position other than the drive range position, and the second inhibiting means may block the second communication when the automatic transmission is set in either the first or second gear while the shift lever is set in the drive range position.

DESCRIPTION OF THE FIRST PREFERRED EMBODIMENT

Figure 1:
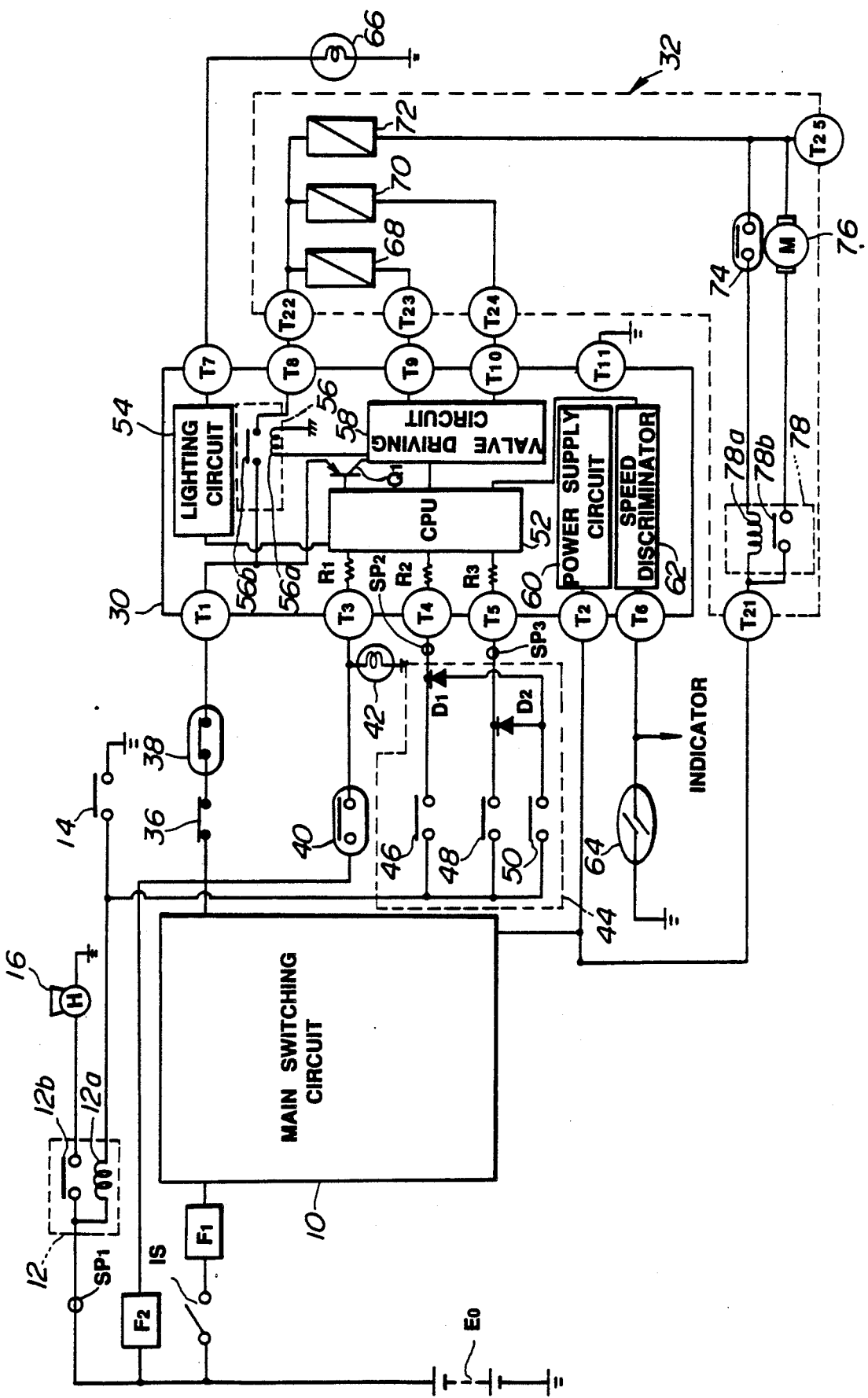
FIG. 1 is a block diagram of the first preferred embodiment of a cruise control system according to the present invention.
Figure 2:
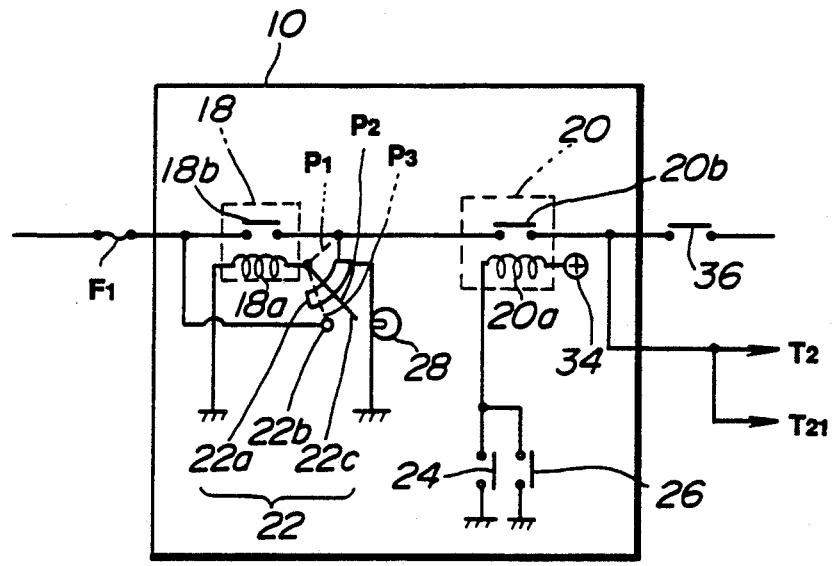
FIG. 2 is a block diagram of a main switching circuit incorporated in the system of FIG. 1.

Referring now to the drawings, particularly to FIGS. 1 and 2, the first preferred embodiment of a cruise control system, according to the present invention, is described below.

In this embodiment, the system is incorporated in a vehicle with a manual transmission.

As shown in FIG. 1, the system includes a main switching circuit 10 which is connected to a power supply $E_0$ via an ignition switch IS and a fuse F1. The power supply $E_0$ is also connected to one end of each of a relay coil 12a and a normally open contact 12b of a horn relay 12 via a first slip ring SP1. The other end of the relay coil 12a of the horn relay 12 is connected to ground via a horn switch 14, and the other end of the normally open contact 12b of the horn relay 12 is connected to ground via a horn 16. In response to turning ON of the horn switch 14, electricity passes through the relay coil 12a, so that the normally open contact 12b is closed, thereby the horn 16 is active.

As can be seen clearly from FIG. 2, the main switching circuit 10 comprises a main relay 18, a hold relay 20, a manually operable switch 22, a fourth gear detecting switch 24 and a fifth gear detecting switch 26. The main relay 18 includes a relay coil 18a and a normally open contact 18b, and the hold relay 20 includes a relay coil 20a and a normally open contact 20b. The manually operable switch 22 includes stationary contacts 22a and 22b and a movable contact 22c which can be moved between a first position P1 in which the movable contact 22c is in contact with neither stationary contact 22a nor 22b, a second position P2 in which the movable contact 22c is in contact with only the stationary contact 22a, and a third position P3 in which the movable contact 22c is in contact with both of the stationary contacts 22a and 22b. The manually operable switch 22 further includes a coil spring not shown, by which the movable contact 22c is biased toward the position P2. Therefore, when the movable contact 22c is released from the driver's hand after it is depressed, it returns position P2 due to the biasing force of the coil spring.

The stationary contact 22a of the manually operable switch 22 is connected to one end of the normally open contact 18b of the main relay 18, the other end of which is connected to the power supply $E_0$ via the fuse F1 and the ignition switch IS. The stationary contact 22a is also connected to ground via a lamp 28. The stationary contact 22b of the manually operable switch 22 is connected to the power supply $E_0$ via the fuse F1 and the ignition switch IS. The movable contact 22c of the manually operable switch 22 is connected to one end of the relay coil 18a of the main relay 18, the other end of which is connected to ground. When the movable contact 22c is depressed by the driver' hand to be positioned at the position P3, the communication between the relay coil 18a of the main relay 18 and the power supply $E_0$ is established via the ignition switch IS, the fuse F1, the stationary contact 22b and the movable contact 22c, so that electricity passes through the relay coil 18a, thereby the normally open contact 18b of the main relay 18 is closed. Thereafter, when the driver releases the movable contact 22c, it returns the position P2. In this position, self-hold electricity can pass through the relay coil 18a since the communication between the relay coil 18a and the power supply $E_0$ is established via the ignition switch IS, the fuse F1, the normally open contact 18b, the stationary contact 22a and the movable contact 22c. As a result, the normally open contact 18b remains closed.

One end of the normally open contact 20b of the hold relay 20 is connected to the power supply $E_0$ via the ignition switch IS, the fuse F1 and the normally open contact 18b of the main relay 18, and the other end thereof is in communication with a terminal T1 of a controller 30 and is connected to a terminal T2 of the controller 30 and a terminal T21 of an actuator 32, which will be described hereafter. Therefore, electric power can be supplied to the terminals T1, T2 and T21 when both of the main relay 18 and the hold relay 20 are turned on. One end of the relay coil 20a of the hold relay 20 is connected to a DC power supply 34, and the other end thereof is connected to ground via a parallel circuit which is comprised of the fourth gear detecting switch 24 and fifth gear detecting switch 26. The fourth gear detecting switch 24 is closed when the transmission is set in the fourth gear, and the fifth gear detecting switch 26 is closed when the transmission is set in the fifth gear. Therefore, when the transmission gear is set in either the fourth gear or fifth gear, electricity passes through the relay coil 20a of the hold relay 20, so that the hold relay 20 is turned on, thereby electric power can be supplied to terminals T1, T2 and T21.

As shown in FIG. 1, the normally open contact 20b of the hold relay 20 is connected to the terminal T1 via a clutch switch 36 and a brake switch 38. Though the clutch switch 36 is usually closed, it is opened when the driver depresses a clutch pedal not shown while shifting the transmission gear. Though the brake switch is also usually closed, it is opened when the driver depresses a brake pedal, not shown. Therefore, when the driver depresses either the clutch pedal or the brake pedal, electric power is not supplied to the terminal T1 of the controller 30. In addition, one end of a brake lamp switch 40 is connected to the power supply $E_0$ via a fuse F2, and the other end thereof is connected to ground via a brake lamp 42. When the driver depresses the brake pedal, the brake lamp switch 40 is closed so that the brake lamp 42 is turned on. The other end of the brake lamp switch 40 is also connected to a terminal T3 so that electrical power is supplied thereto when the brake lamp switch 40 is closed.

The cruise control system has manually operable switching unit 44 which is installed on the steering panel. The manually operable switching unit 44 includes a set switch 46, a resume/acceleration switch 48 and a cancel switch 50.

The set switch 46 serves to set a desired vehicle speed. For example, when the set switch 46 is closed while the vehicle is running at a speed of 60 kilometer/hour, the vehicle will run at a constant speed of 60 kilometer/hour without the driver having to touch the accelerator pedal. In this constant speed driving condition, i.e. while the vehicle is running at the set speed of 60 kilometer/hour, when the set switch 46 is closed again, the vehicle decelerates due to engine braking. Thereafter, if the set switch 46 is opened when the vehicle reaches the desired lower speed, lower speed setting can be obtained. That is, the set switch 46 can also serve as a coast switch.

The resume/acceleration switch 48 has two functions, i.e. a resume function and an acceleration function. When the resume/acceleration switch 48 is closed in the constant speed driving condition, the vehicular speed increases gradually, and thereafter when the switch 48 is opened, the cruise control system is reset so that the vehicle runs at the newly set speed. In addition, after the cruise control system is set so that the vehicle runs at the speed of 60 kilometer/hour as mentioned above, when the setting of the system is canceled by braking operation or the like, the vehicular speed becomes less than 60 kilometer/hour. In this condition, when the resume/acceleration switch 48 is operated again, the vehicular speed increases gradually, and the system is set again so that the vehicle runs at the previously set speed stored in a CPU 52 of the controller 30 which will be described hereafter, i.e. 60 kilometer/hour. Alternatively, a resume switch and an acceleration switch which operate independently of each other may be substituted for the resume/acceleration switch 48.

The cancel switch 50 serves to cancel the setting of the system, i.e. the constant speed driving condition. When the cancel switch 50 is closed, the setting of the system is canceled.

One end of each of the set switch 46, the resume/acceleration switch 48 and the cancel switch 50 is connected to the power supply $E_0$ via the first slip ring SP1 and the relay coil 12a of the horn relay 12. The other end of the set switch 46 is connected to a terminal T4 of the controller 30 via a second slip ring SP2, and the other end of the resume/acceleration switch 48 is connected to a terminal T5 of the controller 30 via a third slip ring SP3. The other end of the cancel switch 50 is connected to the terminal T4 of the controller 30 via a diode D1 and the second slip ring SP2, and is also connected to the terminal T5 thereof via a diode D2 and the third slip ring SP3.

The controller 30 comprises the CPU 52, a lighting circuit 54, a relay 56, a valve driving circuit 58, a power supply circuit 60 and a vehicle speed discriminating circuit 62.

The vehicle speed discriminating circuit 62 is connected to one end of a vehicular speed sensor 64, the other end of which is connected to ground, via a terminal T6. The vehicle speed discriminating circuit 62 discriminates actual vehicle speed on the basis of signals received from the vehicular speed sensor 64, and outputs a signal indicative of the actual vehicle speed to the CPU 52.

The CPU 52 is connected to the terminals T3, T4 and T5 via resistors R1, R2 and R3, respectively. The CPU 52 houses therein a microcomputer, a storage means for storing data in relation to the constant speed driving, and so forth. The CPU 52 outputs control signals on the basis of various signals received through the terminals T1 to T6.

The lighting circuit 54 is connected to the CPU 52 and is also connected to a cruise lamp 66 via a terminal T7 so that it outputs a signal to the terminal T7 on the basis of signals received from the CPU 52 for turning the cruise lamp 66 on.

The relay 56 comprises a relay coil 56a and a normally open contact 56b. One end of the normally open contact 56b of the relay 56 is connected to the terminal T1, and the other end thereof is connected to a terminal T8. One end of the relay coil 56a of the relay 56 is connected to ground, and the other end thereof is connected to the collector electrode of a transistor Q1. The emitter electrode of the transistor Q1 is connected to the terminal T1, and the base electrode thereof is connected to the CPU 52, so that a control signal produced from the CPU 52 can be supplied to the base electrode of the transistor Q1. When this control signal is outputted to the base electrode of the transistor Q1, the transistor Q1 is turned on. In response to turning ON of the transistor Q1, electricity passes through the relay coil 56a of the relay 56, so that the normally open contact 56b is closed, thereby communication between the terminals T1 and T8 is established via the normally open contact 56b.

The valve driving circuit 58 is connected to the CPU 52 and also to terminals T9 and T10 so that it produces signals for driving a supply valve 68 and an air valve 70 of the actuator unit 32, which will be described hereafter, on the basis of the control signals received from the CPU 52.

The power supply circuit 60 is connected to the terminal T2, so that a given DC voltage is applied to the aforementioned circuits, such as the lighting circuit 54, the valve driving circuit 58 and the vehicle speed discriminating circuit 62, when electrical power is supplied to the power supply circuit 60 from the power supply $E_0$.

Furthermore, the controller 30 has a terminal T11 which is connected to ground.

The actuator 32 comprises the supply valve 68, the air valve 70, a release valve 72, a pressure switch 74, a motor 76 and a motor relay 78. In this embodiment, a positive pressure type actuator is used as the actuator 32. Terminals T22, T23 and T24 of the actuator 32 are connected to the terminals T8, T9 and T10, respectively. The supply valve 68 is provided between the terminals T22 and T23, and the air valve 70 is provided between the terminals T22 and T24. The release valve 72 is provided between the terminal T22 and a terminal T25. One end of each of a relay coil 78a and a normally open contact 78b of the motor relay 78 is connected to the terminal T21. The other end of the relay coil 78a is connected to the terminal T25 via the pressure switch 74, and the other end of the normally open contact 78b is connected to the terminal T25 via the motor 76.

The pressure switch 74 monitors air pressure within a tank not shown. When the air pressure is less than a predetermined value, the pressure switch 74 is turned on, so that electricity passes through the relay coil 78a of the motor relay 78, thereby the motor relay 78 is turned on. In response to turning ON of the motor relay 78, the motor 76 becomes active so that the air pressure is maintained at a constant value. By controlling the supply valve 68 and the air valve 70 on the basis of control signals received from the CPU 52 via the valve driving circuit 58, a diaphragm not shown is actuated, so that the angle of the throttle valve is adjusted and, thereby, engine speed is controlled.

In the aforementioned embodiment, the diaphragm is actuated on the basis of positive pressure of air within the tank not shown. Although so-called positive pressure type actuator has been used as the actuator in the aforementioned embodiment, an appreciate actuator, for example, a negative pressure type actuator which is actuated on the basis of negative pressure of the engine can be used according to the present invention.

The operation of the first preferred embodiment of a cruise control system, according to the present invention, is described below.

First, a process for setting the cruise control system when the vehicle is driving at a speed of, e.g. 60 kilometer/hour while the manual transmission gear is set in a gear position suitable for the constant-speed driving, e.g. at the fifth gear, is described below.

Since the manual transmission is set in the fifth gear, the fifth gear detecting switch 26 shown in FIG. 2 is closed, so that electricity passes through the relay coil 20a of the hold relay 20, thereby the normally open contact 20b is closed. In this condition, the manually operable switch 22 is operated. That is, the movable contact 22c of the manually operable switch 22 is positioned at the position P3. As a result, the communication between the power supply $E_0$ and the relay coil 18a of the main relay 18 is established via the ignition switch IS, the fuse F1, the stationary contact 22b and the movable contact 22c, so that electricity passes through the relay coil 18a, thereby the normally open contact 18b is closed. Thereafter, when the driver releases the movable contact 22c, it returns the position P2 due to the biasing force of the spring. In this condition, the communication between the power supply $E_0$ and the relay coil 18a is established via the ignition switch IS, the fuse F1, the normally open contact 18b, the stationary contact 22a and the movable contact 22c, so that self-hold electricity passes through the relay coil 18a. As a result, communication between the power supply $E_0$ and the terminals T1, T2 and T21 is established via the ignition switch IS, the fuse F1 and the normally open contacts 18b and 20b, so that electrical power can be supplied to the terminals T1 and T2 of the controller 30 and the terminal T21 of the actuator 32.

In this condition, when the set switch 46 is closed by the driver, the CPU 52 receives a signal which indicates that the set switch 46 is operated, causing the transistor Q1 to be turned on. As a result, the communication between the power supply $E_0$ and the relay coil 56a is established via the ignition switch IS, the fuse F1, the normally open contacts 18b and 20b, the clutch switch 36, the brake switch 38, the terminal T1 and the transistor Q1, so that electricity passes through the relay coil 56a, thereby the normally open contact 56b of the relay 56 is closed. Therefore, electrical power is supplied to the actuator 32 via the terminals T1 and T8 and the normally open contact 56b. In addition, data indicative of current vehicular speed is received in the storage means of the CPU 52. The CPU 52 outputs a control signal to the valve driving circuit 58 at a timing corresponding to the current vehicular speed, for controlling the actuator 32 so as to adjust the engine speed. The CPU 52 also outputs a control signal to the lighting circuit 54 to cause the cruise lamp 66 to be turned on. Thus, the cruise control system is set so that the vehicle runs at a constant speed of 60 kilometer/hour.

In cases where the transmission is shifted into the second or first gear, such as when engine braking is desired while the vehicle running down a steeply inclined path, both of the fourth gear detecting switch 24 and the fifth gear detecting switch 26 are opened, so that the normally open contact 20b of the hold relay 20 is opened. When the normally open contact 20b is opened, electrical power does not supplied to the terminals T1 and T2 of the controller 30 and the terminal T21 of the actuator 32. Therefore, both the controller 30 and the actuator 32 are not active when the transmission is set in the second or first gear, so that the vehicle is inhibited from traveling at the set constant speed, i.e. the setting of the system is inhibited. Furthermore, when the transmission is also set in third, neutral or reverse gear, the setting of the system can be inhibited.

As set forth above, the first preferred embodiment of a cruise control system, according to the present invention, inhibits setting of the constant speed driving, even if the driver operates the set switch 46 or the like erroneously while the transmission is set in an unsuitable gear for cruise control operation, i.e. in a gear other than the fourth or fifth gear.

Figure 3:
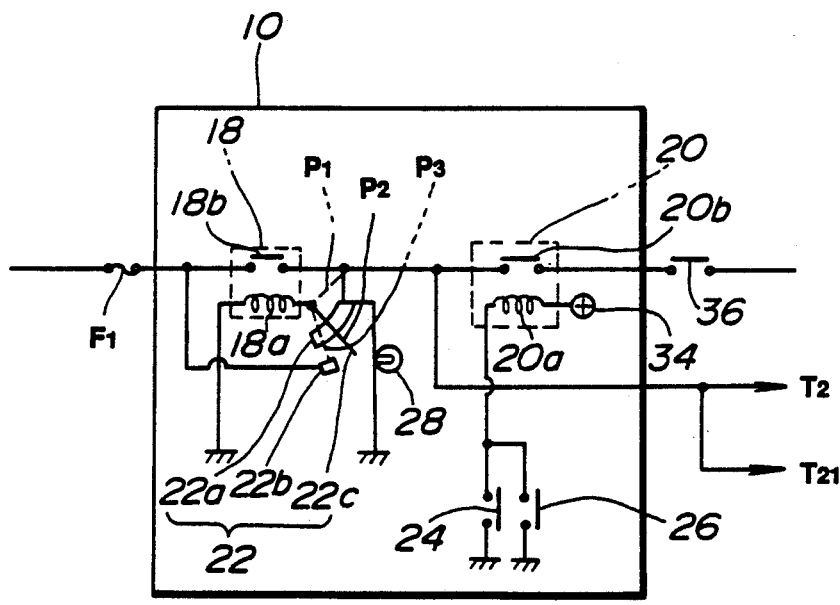
FIG. 3 is a block diagram of another main switching circuit incorporated in the system of FIG. 1.

As shown in FIG. 3, according to the first preferred embodiment of the cruise control system of the present invention, electrical power can be also supplied to the terminal T2 of the controller 30 and the terminal T21 of the actuator 32 without passing through the normally open contact 20b of the hold relay 20. That is, the terminals T2 and T21 can be connected directly to a point between the normally open contact 18b of the main relay 18 and the normally open contact 20b of the hold relay 20. In this embodiment, when the transmission is set in a predetermined gear, i.e. in a gear other than fourth or fifth gear, not only the setting of the system is inhibited by blocking the communication between the power supply $E_0$ and the actuator 32 via the terminal T1 of the controller 30, but electrical power is also supplied to the terminal T2 of the controller 30. Thereafter, since the controller 30 is active, the resume setting of the system can be easily performed. That is, since the previous constant speed driving data is stored in the storage means of the CPU 52, the previously set constant speed can be obtained by operating the resume/acceleration switch 48 after the transmission is set in fourth or fifth gear.

Figure 4:
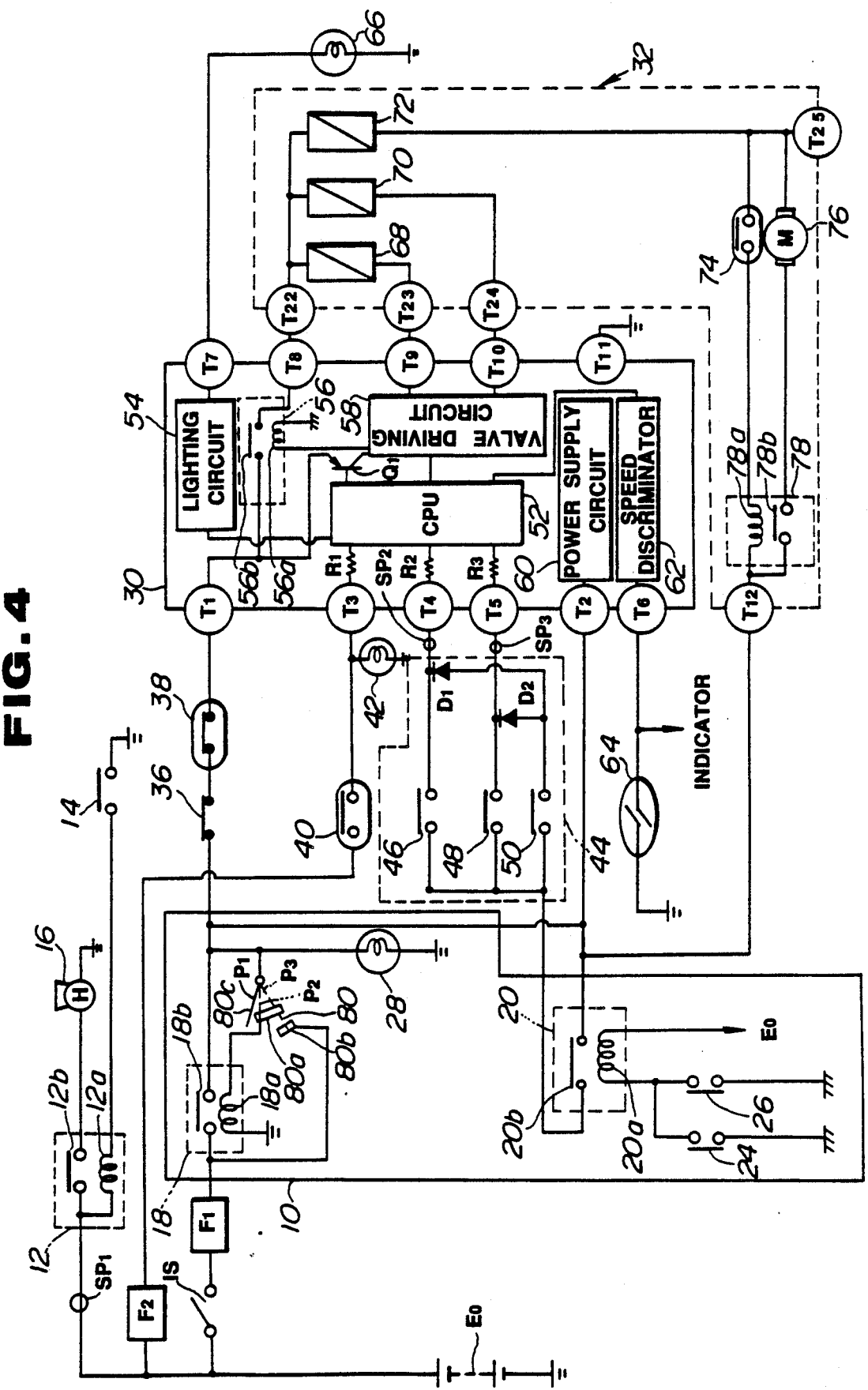
FIG. 4 is a block diagram of a cruise control system in a variation of the system of FIG. 1.

FIG. 4 illustrates another embodiment of a cruise control system according to the present invention. In this embodiment, the normally open contact 20b of the hold relay 20 is provided between the normally open contact 18a of the main relay 18 and the manually operable switching unit 44 which includes the set switch 46, the resume/acceleration switch 48 and the cancel switch 50. In addition, electrical power can be supplied to the terminals T1 and T2 of the controller 30 and the terminal T21 of the actuator without going through the normally open contact 20b of the hold relay 20, i.e. bypassing the normally open contact 20b. Therefore, when the transmission is set in neither fourth nor fifth gear, the manually operable switching unit 44 is not active, so that the setting of the system is inhibited. According to this embodiment, when the transmission is not set in a predetermined gear mode, i.e. in any mode other than fourth or fifth gear, electrical power is not supplied to the controller 30 and the actuator 32 and the setting of the system can be inhibited.

A manually operable switch 80 which comprises stationary contacts 80a and 80b and a movable contact 80c may be substituted for the manually operable switch 22, the function thereof being the same as that of the switch 22.

DESCRIPTION OF THE SECOND PREFERRED EMBODIMENT

Figure 5:
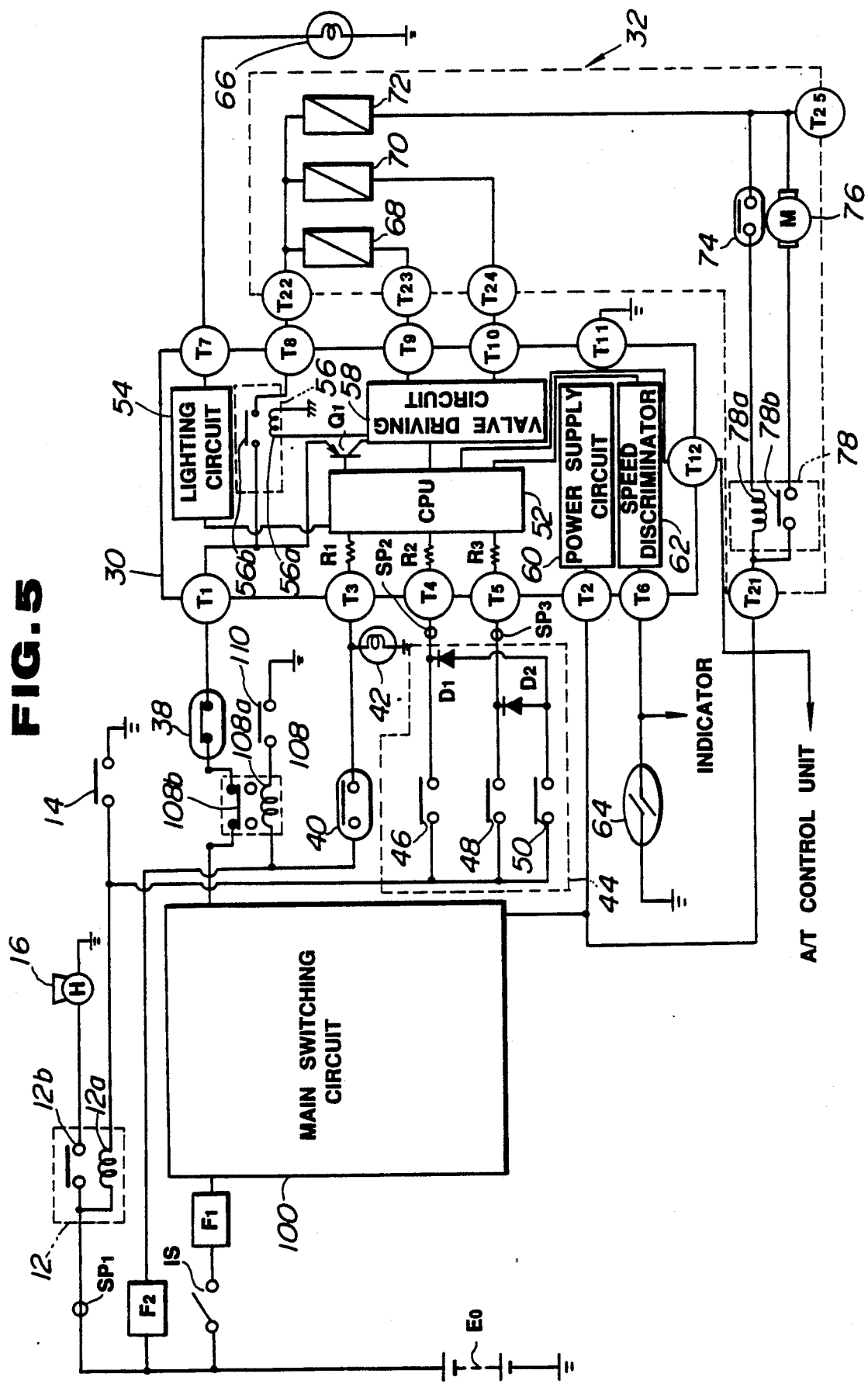
FIG. 5 is a block diagram of the second preferred embodiment of a cruise control system according to the present invention.
Figure 6:
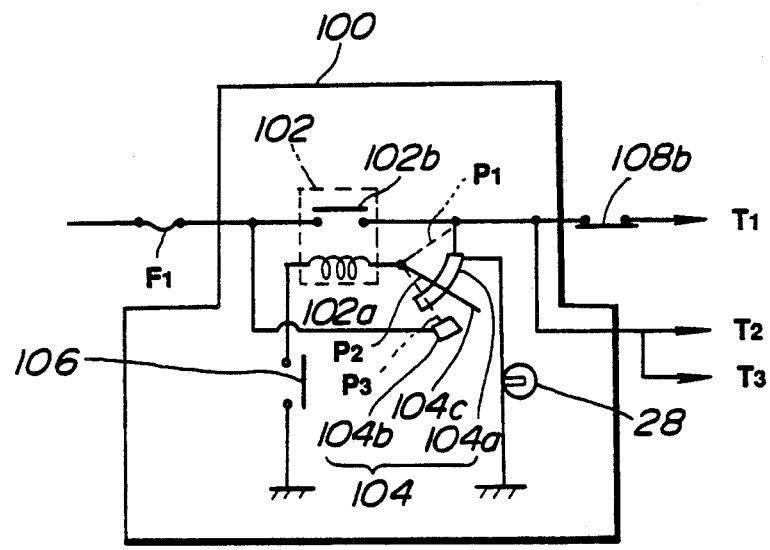
FIG. 6 is a block diagram of a main switching circuit incorporated in the system of FIG. 5.

FIGS. 5 and 6 illustrate the second preferred embodiment of a cruise control system according to the present invention.

In this embodiment, the system is incorporated in a vehicle with an automatic transmission.

As shown in FIG. 6, the main switching circuit 100 comprises a main relay 102, a manually operable switch 104 and a D range detecting switch 106. The main relay 102 includes a relay coil 102a and a normally open contact 102b. The manually operable switch 104 includes stationary contacts 104a and 104b and a movable contact 104c. The function of the manually operable switch 104 is the same as that of manually operable switch 22 according to the first preferred embodiment.

The stationary contact 104a of the manually operable switch 104 is connected to one end of the normally open contact 102b of the main relay 102, the other end of which is connected to the power supply $E_0$ via the ignition switch IS and the fuse F1. The stationary contact 104a is also connected to ground via the lamp 28. The stationary contact 104b of the manually operable switch 104 is connected to the power supply $E_0$ via the ignition switch IS and the fuse F1. The movable contact 104c of the manually operable switch 104 is connected to one end of the relay coil 102a of the main relay 102, the other end of which is connected to ground via the D range detecting switch 106 which is closed when the automatic transmission, not shown, is set in the normal driving range, i.e. the D range and which is opened when the transmission is set in a range other than the D range. As set forth hereafter, the D range detecting switch 106 serves as an inhibiting means for inhibiting the setting of the cruise control system.

As shown in FIG. 5, the communication between the main switching circuit 100 and the terminal T1 of the controller 30 is established via a cut relay 108 and the brake switch 38. The cut relay 108 comprises a relay coil 108a and a normally closed contact 108b. One end of the normally closed contact 108b is connected to the normally open contact 102b of the main relay 102, and the other end thereof is connected to the terminal T1 of the controller 30 via the brake lamp 38. One end of the relay coil 108a of the cut relay 108 is connected to the power supply $E_0$ via the slip ring SP1 and the relay coil 12a of the relay coil 12, and the other end thereof is connected to ground via an inhibitor switch 110. The inhibitor switch 110 is closed when the automatic transmission is set in either the parking range (P range) or the neutral range (N range). When the inhibitor switch 110 is closed, electricity passes through the relay coil 108a of the cut relay 108, so that the normally closed contact 108b thereof is opened, thereby the communication between the main switching circuit 100 and the terminal T1 of the controller 30 is blocked.

Other aspects of the embodiment are similar to the first preferred embodiment of the cruise control system according to the present invention.

The operation of the second preferred embodiment of the cruise control system, according to the present invention, is described below.

First, a process for setting the cruise control system when the vehicle is driving at a speed of, e.g. 60 kilometer/hour while the automatic transmission is set in the usual driving mode, i.e. the D range, will be described below.

Since the automatic transmission is set in the D range, the D range detecting switch 106 is closed, so that one end of the relay coil 102a of the main relay 102 is connected to ground. In this condition, the manually operable switch 104 is operated. That is, the movable contact 104c of the manually operable switch 104 is positioned at the position P3. As a result, the communication between the power supply $E_0$ and the relay coil 102a is established via the ignition switch IS, the fuse F1, the stationary contact 104b and the movable contact 104c, so that electricity passes through the relay coil 102a, thereby the normally open contact 102b is closed. Thereafter, when the driver releases the movable contact 104c, it returns to the position P2 due to the biasing force of the spring. In this condition, the communication between the power supply $E_0$ and the relay coil 102a is established via the ignition switch IS, the fuse F1, the normally open contact 102b, the stationary contact 104a and the movable contact 104c, so that self-hold electricity passes through the relay coil 102a. As a result, the communication between the power supply $E_0$ and terminals T1, T2 and T21 is established via the ignition switch IS, the fuse F1 and the normally open contact 102b, so that electrical power can be supplied to the terminals T1 and T2 of the controller 30 and the terminal T21 of the actuator 32.

In this condition, when the set switch 46 is closed by the driver, the CPU 52 receives a signal which indicates that the set switch 46 is operated, to cause the transistor Q1 to be turned on. As a result, communication between the power supply $E_0$ and the relay coil 56a is established via the ignition switch IS, the fuse F1, the normally open contact 102b, the normally closed contact 108b, the brake switch 38, the terminal T1 and the transistor Q1, so that electricity passes through the relay coil 56a, thereby the normally open contact 56b of the relay 56 is closed. Therefore, electrical power is supplied to the actuator 32 via the terminals T1 and T8 and the normally open contact 56b. In addition, data indicative of current vehicular speed is received in the storage means of the CPU 52. The CPU 52 outputs a control signal to the valve driving circuit 58 at a timing corresponding to the current vehicular speed, for controlling the actuator 32 so as to adjust the engine speed. The CPU 52 also outputs a control signal to the lighting circuit 54 to cause the cruise lamp 66 to be turned on. Thus, the cruise control system is set so that the vehicle runs at a constant speed of 60 kilometer/hour thereafter.

In cases where the automatic transmission is set in a range other than the D range, e.g. at the first or second range, the D range detecting switch 106 is opened, so that the normally open contact 102b of the main relay 102 is opened. When the normally open contact 102b is opened, electrical power is not supplied to the terminals T1 and T2 of the controller 30 and the terminals T21 of the actuator 32. Therefore, both the controller 30 and the actuator 32 are not active when the automatic transmission is set in the first or second range, so that setting of the system can be inhibited.

As set forth above, the second preferred embodiment of a cruise control system, according to the present invention, can not be set, even if the driver erroneously operates the set switch 46 or the like while the transmission is set in a mode other than the usual driving mode.

Figure 7:
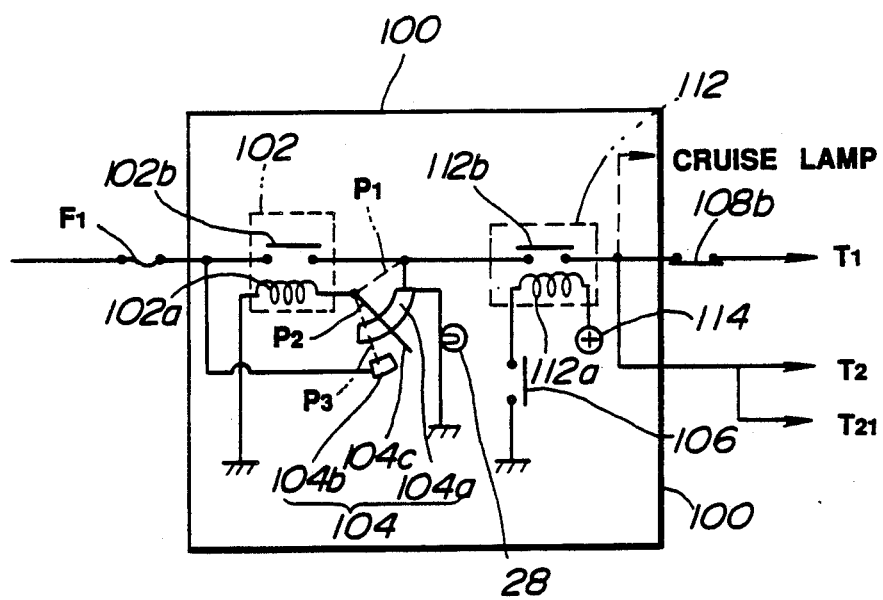
FIGS. 7 and 8 are block diagrams of other main switching circuits incorporated in the system of FIG. 5.

As shown in FIG. 7, according to the second preferred embodiment of a cruise control system of the present invention, the main switching circuit 100 may also include a D range relay 112 which comprises a relay coil 112a and a normally open contact 112b. The normally open contact 112b is provided between the normally open contact 102b of the main relay 102 and the normally closed contact 108b of the cut relay 108. One end of the relay coil 112a of the D range relay 112 is connected to DC a power supply 114, the other end thereof is connected to ground via the D range detecting switch 106. When the automatic transmission is set in a range other than the D range, the D range detecting switch 106 is opened, so that the normally open contact 112b of the D range relay 112 is opened, thereby the communications between the power supply $E_0$ and the terminals T1, T2 and T3 can be blocked. Therefore, setting of the system can be inhibited by blocking the communications between the power supply $E_0$, and the controller 30 and the actuator 32. Furthermore, the cruise lamp 66 can be directly connected to a point between normally open contact 112b of the D range relay 112 and the normally closed contact 108b of the cut relay 108 without connected to the terminal T7 of the controller 30. According to this embodiment, since setting of the system is inhibited without changing the positions of the normally open contact 102b of the main relay 102 and the movable contact 104c of the manually operable switch 104, the next setting of the system can be easily performed.

Figure 8:
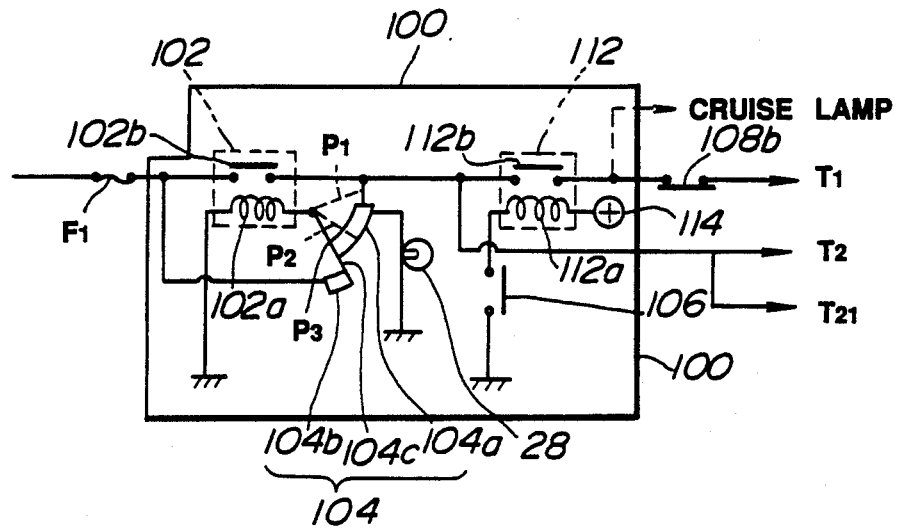

In addition, as shown in FIG. 8, electrical power can be supplied to the terminal T2 of the controller 30 and the terminal T21 of the actuator 32 without passing through the normally open contact 112b of the D range relay 112. That is, the terminals T2 and T21 can be directly connected to a point between the normally open contact 102b of the main relay 102 and the normally open contact 112b of the D range relay 112. According to this embodiment, electrical power is supplied to the terminal T2 of the controller 30 while it is not supplied to the actuator 32 via the terminals T1 and T7 of the controller 30. Thereafter, since the controller 30 is active, the next setting of the system can be easily performed. That is, since the previous speed setting is stored in the storage means of the CPU 52, the system is returned to the previous setting by operating the resume/acceleration switch 48 after the automatic transmission is set in the D range.

Figure 9:
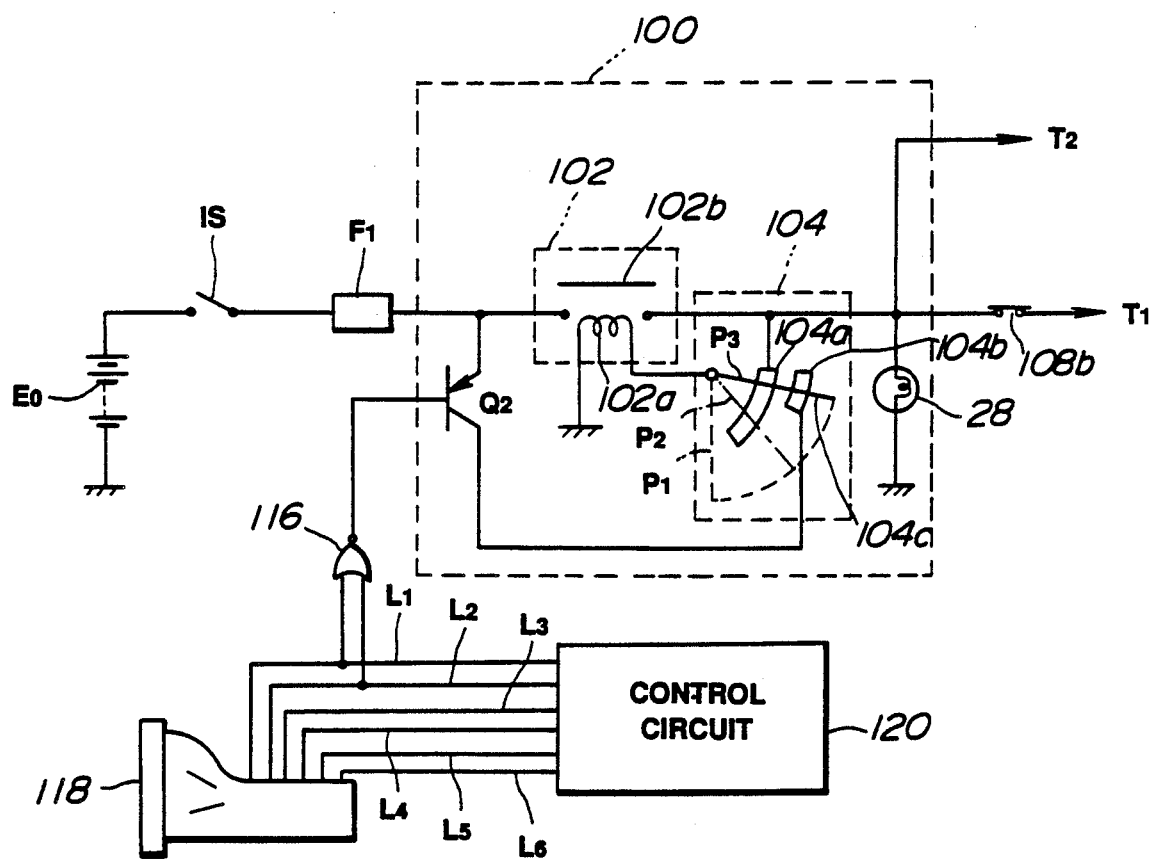
FIG. 9 is a block diagram of another main switching circuit incorporated in the system of FIG. 5, in cases where the system is used in a four speed lock-up automatic transmission with an over drive mechanism.

FIG. 9 illustrates another embodiment of a cruise control system according to the present invention.

In recent years, various type of so-called four speed lock-up automatic transmissions with an over drive mechanism, in which the torque converter of the automatic transmission is provided with a lock-up mechanism for preventing slip loss during high-speed driving, and the actuating point of the lock-up mechanism can be optimally and automatically controlled for improving fuel consumption during high-speed driving, have been developed. In such automatic transmissions, after the shift lever is set in the D range for forward driving, the transmission is automatically shifted gradually from a LO range corresponding to the first gear of a manual transmission to a TOP range corresponding to the third gear of a manual transmission via a second range corresponding to the second gear of a manual transmission, as the vehicle speed increases. In addition, If an OD switch is operated while the shift lever is set in the D range, the transmission is automatically shifted from the third range (TOP range) to the fourth range (OD range) when the engine speed becomes greater than a predetermined value.

In the embodiment of FIG. 9, the cruise control system is operative while the transmission is in the TOP or OD range and the shift lever is set in the D range.

With respect to this embodiment, different constructions from the constructions shown in FIGS. 5 and 6 are described below.

A transistor Q2 is provided between the fuse F1 and the stationary contact 104b of the manually operable switch 104. The collector electrode of the transistor Q2 is connected to the fuse F1, and the emitter electrode thereof is connected to the stationary contact 104b. The base electrode of the transistor Q2 is connected to the output terminal of a negative OR (NOR) circuit 116, so that, on the basis of a NOR output signal of the NOR circuit 116, the transistor Q2 is turned on. A plurality of signal conductors L1 through L6 is provided between an automatic transmission 118 and a control circuit 120 for controlling the automatic transmission 118. The signal conductor L1 serves to transmit a OD signal which is produced when the transmission is shifted to the fourth range after the OD switch is turned on while the shift lever is set in the D range. The signal conductor L2 serves to transmit a TOP signal which is produced when the transmission is shifted to the TOP range while the shift lever is set in the D range. The signal conductor L3 serves to transmit a second signal which is produced when the transmission is shifted to the second range while the shift lever is set in the D range. The signal conductor L4 serves to transmit a LO signal which is produced when the transmission is shifted to the LO range while the shift lever is set in the D range. The signal conductor L5 serves to transmit a neutral signal which is produced when the shift lever is set in the neutral range. The signal conductor L6 serves to transmit a reverse signal which is produced when the shift lever is set in the reverse range. One of the input terminal of the NOR circuit 116 is connected to the signal conductor L1, and the other input terminal thereof is connected to the signal conductor L2. Therefore, the NOR circuit 116 produces H-level signal when the transmission is shifted to the fourth or third range while the shift lever is set the D range. On the basis of the H-level signal outputted from the NOR circuit 116, the transistor Q2 is turned on, so that the main switching circuit 100 can be active by operating the manually operable switch 104. Accordingly, when the automatic transmission is set in a driving mode unsuitable for setting the cruise control system, i.e. when the transmission is set in a range other than the third or fourth range while the shift lever is set in the D range, the transistor Q2 is caused to be turned OFF, so that the main switching circuit 100 is not active. As a result, electricity is not supplied to the controller 30 and the actuator 32, so that setting of the system is inhibited.

What is claimed is:

1. A cruise control system for an automotive vehicle with a manual transmission, which transmission is selectively set in either a first, second, third or fourth gear in an advance drive mode, said system comprising:
   sensor means for monitoring the actual speed of the vehicle to produce a first signal indicative of the detected vehicle speed;
   speed setting means for allowing manual setting of a desired speed of the vehicle to produce a second signal indicative of the set speed;
   actuator means for actuating a mechanism which varies the vehicle speed;
   control means for controlling said actuator means on the basis of said first and second signals so as to adjust the vehicle speed to said set speed; and
   inhibiting means for inhibiting said control means from controlling said actuator means when said manual transmission is set in either said first, second or third gear.

2. A cruise control system as set forth in claim 1, which further comprises a power supply for supplying electrical power to said control means, and wherein said control means controls said actuator means so as to adjust the vehicle speed to said set speed while communication between said power supply and said control means is established, and said inhibiting means blocks said communication when said transmission is set in either said first, second or third gear.

3. A cruise control system for an automotive vehicle with an automatic transmission which transmission is selectively operable between first, second, third and fourth gear while a shift lever is set in a drive range position, said system comprising:
   sensor means for monitoring the actual speed of the vehicle to produce a first signal indicative of the detected vehicle speed;
   speed setting means for allowing manual setting of a desired speed of the vehicle to produce a second signal indicative of the set speed;
   actuator means for actuating a mechanism which varies the vehicle speed;
   control means for controlling said actuator means on the basis of said first and second signals so as to adjust the vehicle speed to said set speed; and
   inhibiting means for inhibiting said control means from controlling said actuator means when said automatic transmission is in either said first or second gear while said shift lever is set in said drive range position.

4. A cruise control system as set forth in claim 3, which further comprises a power supply for supplying electrical power to said control means, and wherein said control means controls said actuator means so as to adjust the vehicle speed to said set speed while communication between said power supply and said control means is established, and said inhibiting means blocks said communication when said automatic transmission is set in either said first or second gear while said shift lever is set in said drive range position.

5. A cruise control system for an automotive vehicle with a manual transmission, which transmission is selectively set in first, second, third or fourth gear in an advance drive mode, said system comprising:
   sensor means for monitoring the actual speed of the vehicle to produce a first signal indicative of the detected vehicle speed;
   speed setting means for allowing manual setting of a desired speed of the vehicle to produce a second signal indicative of the set speed;
   a power supply for supplying electrical power;
   control means for controlling an actuator means on the basis of said first and second signals so as to adjust the vehicle speed to said set speed while communication between said power supply and said control means is established; and
   inhibit means for blocking said communication to inhibit said control means from controlling said actuator means when said manual transmission is set in either said first, second or third gear.

6. A cruise control system for an automotive vehicle with an automatic transmission which transmission is selectively operable between first, second, third and fourth gear while a shift lever is set in a drive range position, said system comprising:

sensor means for monitoring the actual speed of the vehicle to produce a first signal indicative of the detected vehicle speed;

speed setting means for allowing manual setting of a desired speed of the vehicle to produce a second signal indicative of the set speed;

actuator means for actuating a mechanism which varies the vehicle speed;

a power supply for supplying electrical power;

control means for controlling said actuator means on the basis of said first and second signals, so as to adjust the vehicle speed to said set speed while communication between said power supply and said control means is established; and inhibiting means for inhibiting said control means from controlling said actuator means when said automatic transmission is in either said first or second gear while said shift lever is set in said drive range position.

* * * * *